(12) United States Patent
Kim

(10) Patent No.: US 9,009,737 B2
(45) Date of Patent: Apr. 14, 2015

(54) APPARATUS AND METHOD OF TERMINAL FOR PROVIDING FILE SYSTEM FUNCTION

(71) Applicant: Samsung Electronics Co., Ltd., Gyeonggi-do (KR)

(72) Inventor: Joo-Hyun Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/713,093

(22) Filed: Dec. 13, 2012

(65) Prior Publication Data

US 2013/0239129 A1  Sep. 12, 2013

(30) Foreign Application Priority Data

Mar. 6, 2012 (KR) .................. 10-2012-0022786

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)

(52) U.S. Cl.
  CPC .......................... *G06F 9/54* (2013.01)

(58) Field of Classification Search
  None
  See application file for complete search history.

(56) References Cited

U.S. PATENT DOCUMENTS

| | | | |
|---|---|---|---|
| 5,367,681 A * | 11/1994 | Foss et al. ................. | 719/314 |
| 6,724,408 B1 * | 4/2004 | Chen et al. ................. | 715/853 |
| 7,337,207 B2 | 2/2008 | O'Brien et al. | |
| 7,363,338 B2 * | 4/2008 | Kaakani et al. ............. | 709/201 |
| 7,440,752 B2 * | 10/2008 | Naganuma et al. .......... | 455/420 |
| 7,571,440 B2 * | 8/2009 | Vessey et al. ............... | 719/312 |
| 7,620,961 B2 * | 11/2009 | Aasheim et al. ............. | 719/328 |
| 2010/0318590 A1 | 12/2010 | Goldsmith et al. | |
| 2011/0238906 A1 * | 9/2011 | Amir et al. ................. | 711/111 |

* cited by examiner

*Primary Examiner* — H S Sough
*Assistant Examiner* — William C Wood
(74) *Attorney, Agent, or Firm* — Cha & Reiter, LLC

(57) ABSTRACT

A method for operating a terminal providing a file system function, and a terminal having configured hardware is provided. In the method, a specific command is received from a first application. The received specific command is transferred to a second application regardless of whether the second application is executed. An execution result of the specific command is received from the second application.

22 Claims, 9 Drawing Sheets

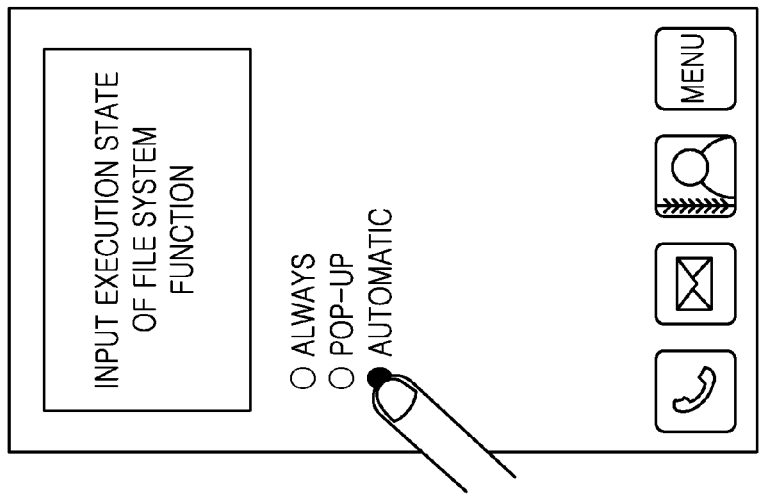
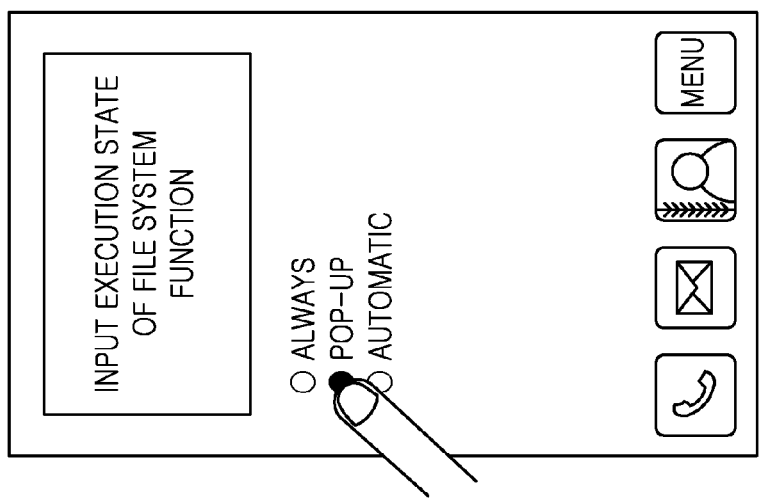
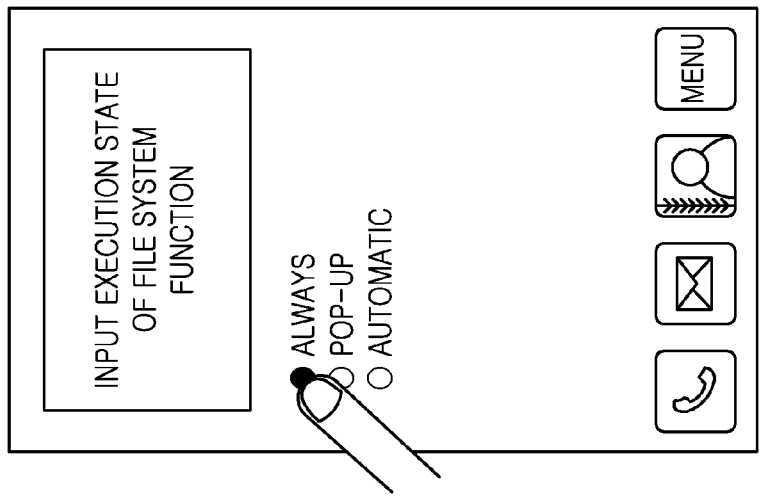

APPARATUS AND METHOD OF TERMINAL FOR PROVIDING FILE SYSTEM FUNCTION

CLAIM OF PRIORITY

This application claims the benefit of priority under 35 U.S.C. §119(a) of a Korean patent application filed in the Korean Intellectual Property Office on Mar. 6, 2012 and assigned Serial No. 10-2012-0022786, the entire disclosure of which is hereby incorporated by reference in its entirety.

BACKGROUND OF THE INVENTION

1. Field of the Invention

The present invention relates to a method for operating a terminal and the terminal thereof. More particularly, the present invention relates to a method of operating a command in two applications.

2. Description of the Related Art

As an application program for providing a file system function is developed, a file system function provided from outside of an Operating System has been developed that is incorporated into the Operating System. For example, when an external application program requests use of a file system, the request is transferred to an actual file system such as Extended File System 3 (EXT3), NT File System (NTFS), File Allocation Table (FAT32), etc. via a Virtual File System (VFS) inside kernel and processed.

Also, a File System in, for example, Userspace (FUSE) also allows a file system provided by an application program to be processed in the lower VFS, so that an application program that uses the file system may use obtain access via a standard input/output interface.

However, in the conventional art, when application program providing a file system function is operated, a relevant application program is executed to obtain file system access. The reason for execution of the relevant program application is because if the relevant application program were not executed, the use request for the file system function cannot be processed.

According to the conventional art, the terminal was able to transfer the specific command received from the first application to the second application only when the second application is being executed. In other words, only when the second application is executed, the terminal was able to receive and execute the relevant command. Therefore, in order to utilize a file system, an application program that provides a relevant file system function needed to be executed in advance.

However, since a point at which the relevant file system is to be used cannot or may not be known, user convenience deteriorates. In fact, sometimes there can be a needless execution of an application program in anticipation of the request for access to a relevant file system that never even materializes.

SUMMARY OF THE INVENTION

An aspect of the present invention is to address at least some of the above-mentioned problems and/or disadvantages and to provide at least the advantages described below. Accordingly, an exemplary aspect of the present invention is to provide an apparatus and a method for allowing a user to easily obtain access to a file system when needed, in which the file system is provided via an application program from the outside of an operating system.

Another exemplary aspect of the present invention is to provide an apparatus and a method for allowing a user to set an operating point of an application program providing a file system, thereby improving user convenience.

According to yet another aspect of the present invention, a method for operating a terminal is provided. The method includes receiving by a controller a specific command from a first application, transferring by a kernel of an Operating System being executed by the controller of the terminal the received specific command to a second application for data processing regardless of whether or not the second application is being executed and receiving an execution result of the specific command from the second application and providing the execution result to the first application to execute a function of the terminal, wherein the first application operates outside of the Operating System of the terminal.

According to a further aspect of the present invention, an apparatus a terminal includes a non-transitory storage, one or more processors being configured with machine executable code to provide, an On Demand File System Manager Module for receiving a specific command from a first application, transferring the received specific command to a second application regardless of whether the second application is being executed, and receiving an execution result of the specific command from the second application and an On Demand File System Interface Module for providing an interface common to the second application and the On Demand File System Manager Module so that the second application is operable, wherein the first application operates outside of an Operating System of the terminal, and a kernel of the Operating System provides an interface between a Virtual File System (VFS) and the controller of the terminal.

In an exemplary embodiment of the present invention, the second application comprises an application providing a file system function.

In an exemplary embodiment of the present invention, the specific command comprises at least one of a command for reading a specific file and a command for storing the specific file in the storage. Still another exemplary aspect of the present invention is to provide an apparatus and a method for providing information as to whether an external file system operates by allowing a terminal to display a separate indicator.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be illustrated from the following description taken in conjunction with the accompanying drawings in which:

FIGS. 5A, 5B, and 5C illustrate examples of setting an execution state of a file system function according to an exemplary embodiment of the present invention;

Throughout the drawings, like reference numerals will be understood to refer to like parts, components and structures.

DETAILED DESCRIPTION

Figure 1A:
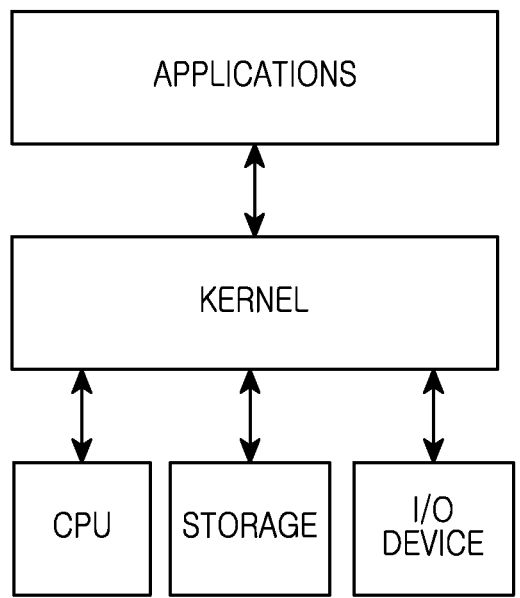
FIG. 1A is basic overview of the operation of a kernel with regard to the bridge between applications and data processing.

The following description with reference to the accompanying drawings is provided to assist a person of ordinary skill in the art in a comprehensive understanding of exemplary embodiments of the invention as defined by the appended claims and their equivalents. The description includes various specific details to assist in that understanding but these are to be regarded as merely exemplary that are provided for illustrative purposes. Accordingly, those of ordinary skill in the art will recognize that various changes and modifications of the embodiments described herein can be made without departing from the scope and spirit of the invention. Also, descriptions of well-known functions and constructions may be omitted for clarity and conciseness when their inclusion could obscure appreciation of the subject matter of the present invention by the person of ordinary skill in the art. Like reference numerals are used for like or similar parts throughout the drawings.

Definitions:

An artisan will appreciate and keep in mind the general definitions of some items below in the specification and drawings as listed herein below: (1) GLIBC An implementation of the C standard library which defines the system calls' and other basic facilities such as open, malloc, printf, exit, and has been "forked" with regard to Linux software by the Linux kernel developers and, more particularly GNU. GLIBC is used in systems that run many different kernels and different hardware architectures. Its most common use is in systems using the Linux kernel on x86 hardware, however, officially supported hardware includes: x86, Motorola 680x0, DEC Alpha, PowerPC, ETRAX CRIS, s390, and SPARC, and can be used in small devices such as mobile terminals.

(2) Kernel—A basic central component of a majority of operating systems that is a bridge between applications and the actual data processing, the kernel manages computer resources and permits different programs to run and use such resources, such as central processing unit (CPU), memory, and input/output devices so as to permit the execution of applications and provide support, by setting up address space for an application, loading the file containing the application's code into memory, set up a program stack and start execution of the program via branching.

(3) Virtual File System—an interface between a kernel and actual file system permits local and network storage devices that is transparent to a user.

Now referring to FIG. 1A, which provides an overview of the operation of a kernel as a bridge between applications and the hardware performing the actual data processing. A kernel manages system resources between the applications and the hardware. In turn, items such as the Virtual File System (VFS) and a File System in Userspace (FUSE) can operate as an interface between the kernel and the actual file system.

Figure 1B:
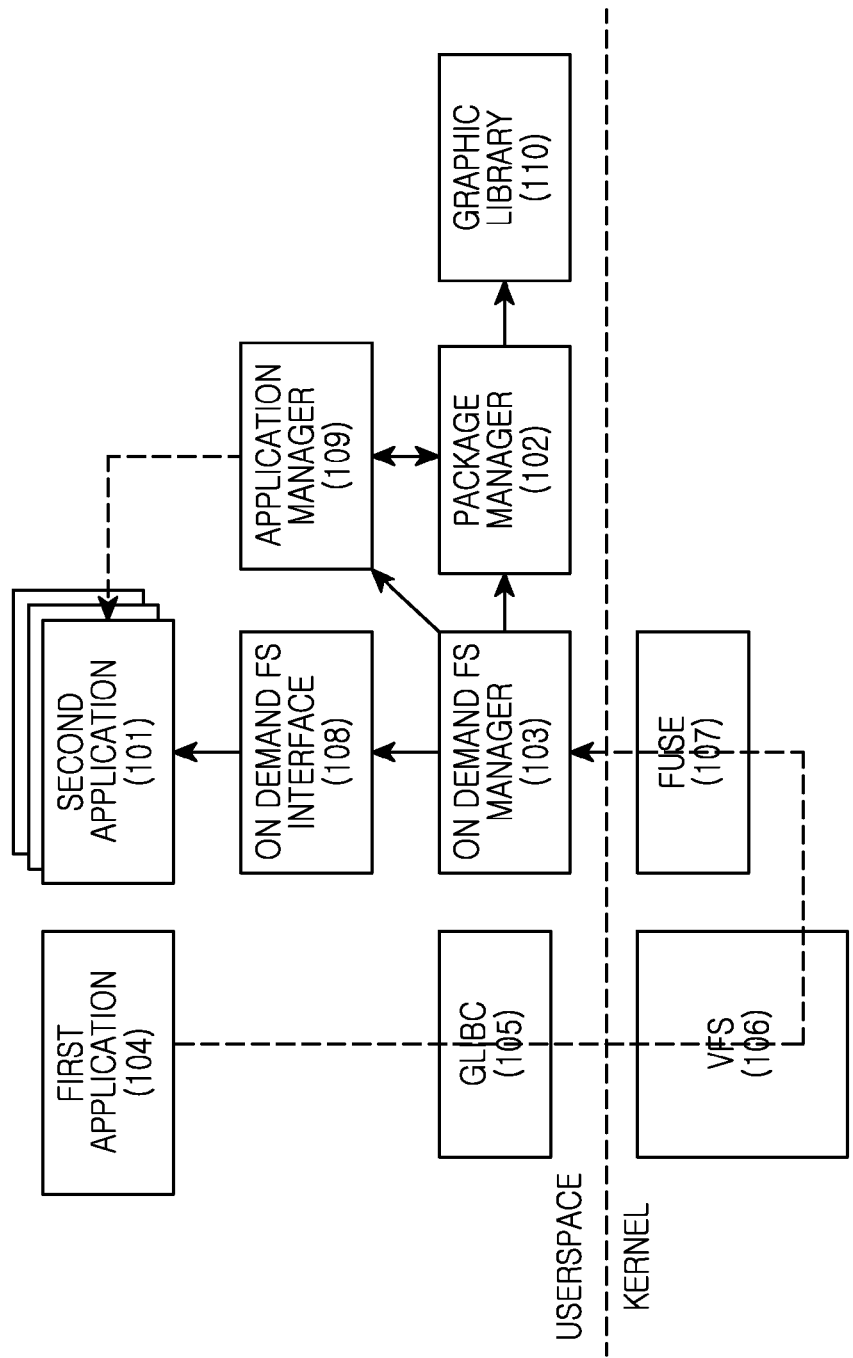
FIG. 1B is a block diagram illustrating an entire construction of a terminal providing a file system function according to an exemplary embodiment of the present invention.

FIG. 1B is a block diagram illustrating an entire construction of a terminal providing a file system function according to an exemplary embodiment of the present invention. There are two applications, first application 104 and second application 101. These applications comprise machine executable code loaded into hardware such as a processor or microprocessor, and are loaded from non-transitory machine readable medium(s).

The second application 101 comprises an application providing a file system function. Here, the file system providing the file system function denotes a system for storing or organizing files so that a user may easily find and access a file or a material in a computer. More specifically, the file system generally denotes managing a physical location of a file using locally attached storage device such as, for example a hard disk or a CD-ROM but may include access means to remote storage on a file server via a client performing a network protocol over a LAN, WAN, etc., and a method with access means in a virtual form. Generally, the file system includes a plurality of layers such as a storage device, an input/output control, a basic file system, a file organize module, and a virtual file system. Therefore, the file system is operable with various types of storage devices such as a hard disk, a CD-ROM drive, a flash memory, etc., and a plurality of file systems may be used for one system.

The second application 101 of the present invention is an application loaded into storage 142 (see FIG. 1C) of the terminal 100b and executed by a processor to provide a file system function and executes a specific command requested by a first application 104. According to an aspect of the present invention, the first application is typically arranged outside of the Operating System of the terminal, and may access the Operating System for the terminal.

For example, when the first application 104 from outside the operating system of the terminal 100b transfers a specific command to the terminal 100b, the terminal allows a File System in Userspace (FUSE) 107 to receive the specific command via the GLIBC 105 and a Virtual File System (VFS) 106. After that, the specific command received by the FUSE 107 is transferred to the second application 101 via an On Demand File System (ON-DEMAND FS) Manager Module 103 and an On Demand File System Interface Module 108. The second application 101 that has received the specific command executes the relevant command and transfers a feedback thereof to the first application 104 in the order opposite to the above-described sequence.

Figure 1C:
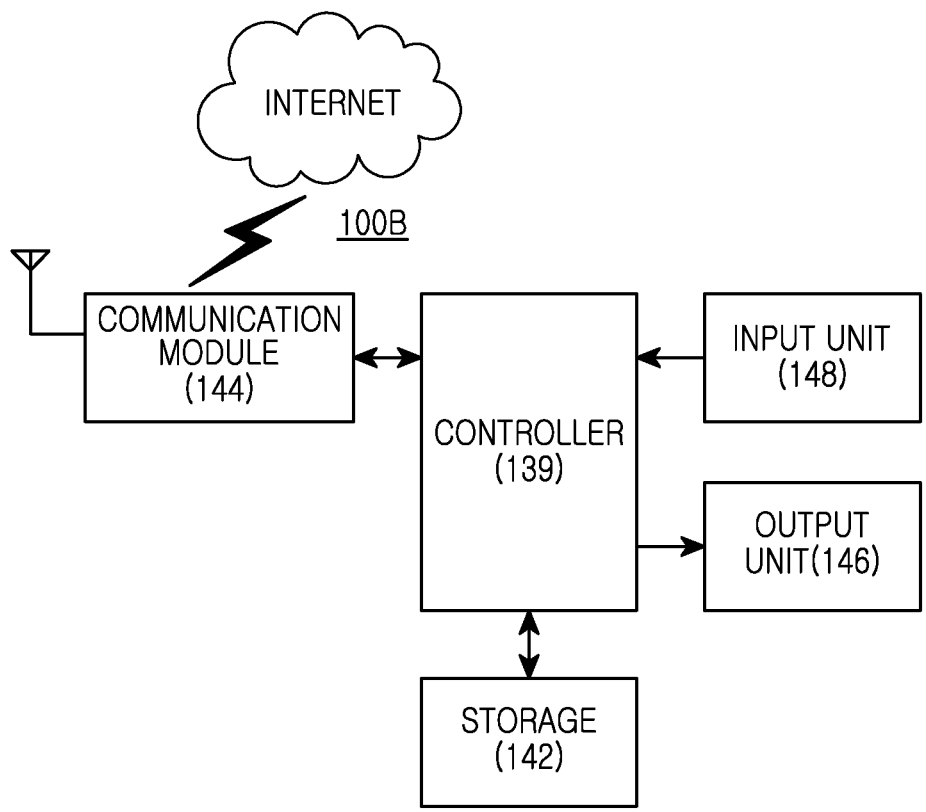
FIG. 1C is a block diagram illustrating a terminal providing a file system function according to an exemplary embodiment of the present invention.

More particularly, FIG. 1C provides a block diagram illustrating a terminal providing a file system function according to an exemplary embodiment of the present invention. As illustrated in FIG. 1C, the terminal may include a controller 139, a communication module 144, an input unit 148, an output unit 146, and a non-transitory storage 142.

The controller 139, which includes a processor or microprocessor loaded with machine executable code, controls an overall operation of the terminal. In the present invention, the controller 139 may include an On Demand File System Manager Module, an On Demand File System Interface Module, an Application Manager Module, a Package Manager Module, and a Graphic Library Module.

As previously discussed in the Background section, according to the conventional art, the terminal was able to transfer the specific command received from the first application to the second application only when the second application is executed. In other words, in the conventional art, only when the second application is executed, the terminal was able to receive and execute the relevant command.

However, according to the present invention, the terminal can transfer the specific command received from the first application 104 to the second application 101 regardless of whether the second application 101 providing the file system function is executed. In other words, according to the present invention, the terminal may receive an execution state (status) of the second application from a user and transfer the specific command received from the first application 104 to the second application 101 even when the second application 101 is not currently being executed so as to receive an execution result of the relevant command from operation of the second application 101.

More specifically, the present invention may function such that the second application 101 is always being executed, or may function such that the second application 101 is automatically executed only when execution of the second application 101 is needed/required, and/or may function such that a user inputs a selection as to whether or not to execute the second application, even when execution of the second application 101 is needed/required. Preferably, it is efficient to set (configure) the present invention to function such that the second application 101 is automatically executed only when execution of the second application 101 is needed/required, or to set the present invention such that a user inputs a selection as to whether or not the second application is to be executed whenever execution of the second application 101 is needed/required. The reason for the different settings is because since a file system service requires a relatively significant data communication generally and constantly uses a device resource such as a CPU, RAM, a battery, etc., it is not preferable to set such that the second application 101 is always executed.

In the case where the second application 101 providing the file system function is installed in (in machine readable storage) the terminal, a Package Manager Module 102 reads information of the second application 101 from the second application 101. Here, the information of the second application 101 is defined as information includes at least one of an ID of the second application, an encryption related information of the second application, and a function of the second application. More specifically, when the second application 101 is installed in the terminal, the Package Manager Module 102 reads information regarding one or more of the ID of the second application, the encryption related information of the second application, and the function of the second application and stores the same. After the reading of information, the Package Manager Module 102 transfers the stored information of the second application to the On Demand File System Manager Module 103.

Another function of the Package Manager Module 102 is to store an execution state of the second application input by a user. More specifically, in the case where the terminal receives a command that instructs to always execute the second application, or a command that instructs to automatically execute the second application when the execution of the second application is necessary, or a command for receiving whether to execute the second application whenever execution of the second application is needed (from a user), each execution state is stored in the Package Manager Module 102. Therefore, the Package Manager Module 102 performs each operation depending on the execution state of the second application set by the user. As an additional function, the Package Manager Module 102 identifies whether or not the file system function is included in the second application 101.

More specifically, in the case where the second application 101 is installed in the terminal, the Package Manager Module 102 can read the information of the second application and utilize the second application to identify whether or not the file system function is included in the relevant application.

With continued regard to FIG. 1B, the On Demand File System Manager Module 103 receives a specific command requested by first application 104 from the File System in Userspace (FUSE) 107 and transfers the specific command to the second application 101 via the On Demand File System Interface Module 108. More specifically, the On Demand File System Manager Module 103 that has received the specific command from the FUSE detects an execution state of the second application, and when the second application 101 is being executed, immediately transfers the specific command to the second application 101 via the On Demand File System Interface Module 108. However, when the second application 101 is not being executed, the On Demand File System Manager Module 103 transfers to an Application Manager Module 109 a command for operating the second application 101. Subsequently, the Application Manager Module 109 that has received the command for executing the second application 101 from the On Demand File System Manager Module 103 operates the second application 101.

Then, the second application 101 is executed to perform a relevant command, and a result of performing the command is fed back to the first application 104 again in a process opposite to the above-described process. That is, the second application 101 performs the specific command requested by the first application and the execution result is fed back to the first application 104 again via the On Demand File System Interface Module 108, the On Demand File System Manager Module 103, the FUSE 107, the VFS 106, and the glibc 105.

With continued reference to FIG. 1A, the first application 104 is an application corresponding to an application program and transfers a specific command to the terminal. In other words, according to the present invention, the first application 104 transfers the specific command to the terminal, but the terminal does not request an Operating System inside the terminal to process the command received from the first application 104 and transfers the specific command to the second application 101 providing that the file system function exists outside of the Operating System. Therefore, according to an exemplary aspect of the present invention, the terminal does not request the internal Operating System to process the specific command received from the first application 104 but receives an execution result of the relevant command from the second application existing outside the Operating System, so that the terminal may easily find and access a file or a material.

The glibc 105 and the VFS 106 are standardized interfaces existing outside and inside of the terminal, respectively. In other words, the glibc 105 and the VFS 106 are interfaces for transferring the specific command received from the first application 104 to the FUSE 107.

The FUSE 107 is a kernel that can be stacked on a Unix or similar type of operating system. More specifically, when the FUSE 107 is used, a user who does not have a right as an operating system may make a file system of his own even without editing a kernel code. In other words, the FUSE 107 connects an actual kernel interface with a user interface so that the user interface may execute a file system code. In the present invention, when the terminal receives a specific command from the first application 104, the FUSE 107 transfers the command to the second application 101 that can perform the relevant command. Preferably, not only the FUSE 107 but also an INOTY may perform the role.

The On Demand File System Interface Module 108 comprises an interface disposed between the On Demand File System Manager Module 103 and the second application 101 and connecting the On Demand File System Manager Module 103 with the second application 101.

The Application Manager Module 109 operates the second application 101. More specifically, when the second application is not currently being executed, the Application Manager Module 109 receives a command for operating the second application 101 from the On Demand File System Interface Module 108 to execute the second application 101.

A Graphic Library Module 110 can provide a user interface for receiving various sets of information. For example, in the case where the user sets the terminal to receive whether or not to execute the second application whenever execution of the second application is needed with respect to an execution state of the second application, the Graphic Library Module 110 displays to the user whether to execute the second application via a display unit of the terminal whenever execution of the second application is needed.

Figure 2B:
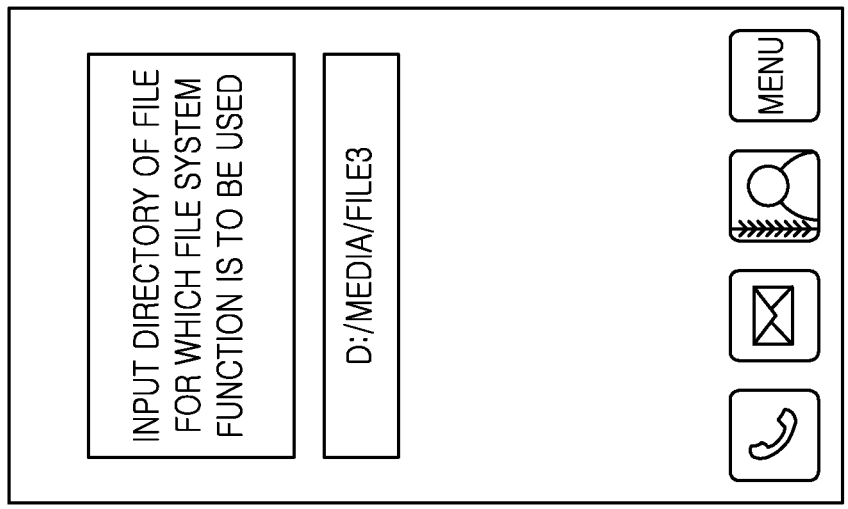
FIGS. 2A and 2B illustrate examples of setting a file system function according to an exemplary embodiment of the present invention.
Figure 2A:
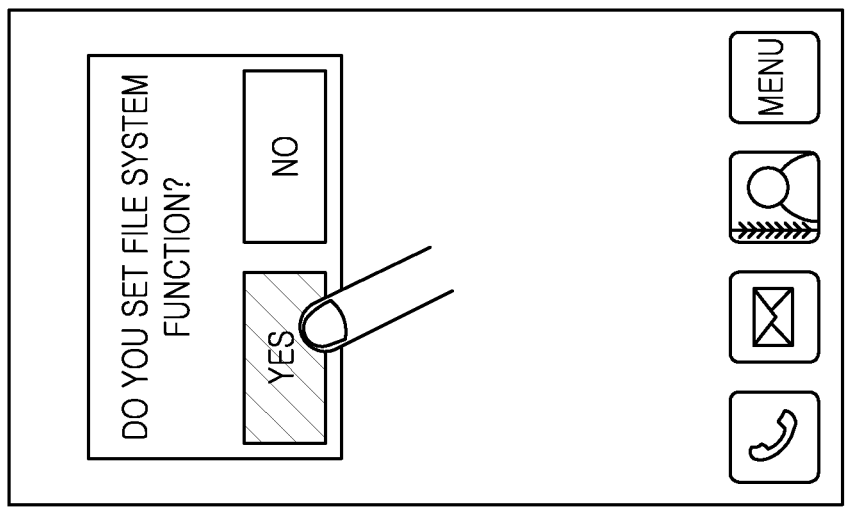

FIG. 2A is a view illustrating an example of setting a file system function according to an exemplary embodiment of the present invention. First, when a user selects a menu item of the terminal in order to set a file system function according to the present invention, various applications stored in the terminal are displayed on a display 146. When the user selects an item for setting the file system function among the various applications of the terminal being displayed, a message asking whether or not to set the file system function is displayed on the display unit of the terminal as illustrated in FIG. 2A. After that, when the user inputs a command for setting the file system function into the display unit 146, the file system function is set. The command can be input either by the input unit 148, or if the display 146 is a touch screen 148, then directly through the display.

Herein, the file system preferably comprises a system for storing and organizing a file so that a computer may easily find and access the file or material. More particularly, the file system generally comprises a managing of a physical location of a file using an actual material store device such as a hard disk or a CD-ROM but may include a method for providing an access to a material on a file server via a client performing a network protocol and a method where only an access means in a virtual form exists. Generally, the file system includes a plurality of layers such as, for example, a storage device, an input/output control, a basic file system, a file organize module, and a virtual file system. Therefore, the file system may support various storage devices that include but are in no way limited to examples such as a hard disk, a CD-ROM drive, a flash memory, etc. In addition, a plurality of file systems may be used for one system. The present invention installs at least one application providing the file system function in the terminal, and when an application requests the terminal to perform a specific command, the application providing the file system function executes the relevant command. Therefore, since a file or material may be easily found and accessed compared to the case where the operating system inside the terminal performs the specific command, the efficiency of the device improves.

FIG. 2B is a view illustrating an example of setting a file directory for which the file system function is to be used according to an exemplary embodiment of the present invention. First, as described with reference to FIG. 2A, when the file system function is set in the terminal, a file directory for which the file system function is to be used is selected. More specifically, contents for which the file system function is to be used are selected among various contents stored in the terminal In other words, a specific file stored in a drive "d" of the terminal is moved to an application providing the file system function, so that in the case where an application calls for the specific file to be moved to the application providing the file system function, and the specific file is called using the application providing the file system function. For example, as illustrated in FIG. 2B, assuming that the device detects a user has selected a file called a "file 3" stored in a directory called Media of the drive "d", when an application calls for the file called the "file 3" stored in the terminal, the terminal does not call the file call for the file 3 via the drive "d" of the terminal but transfers a call command to the application where the file 3 is actually stored. Therefore, according to the present invention, the user may more easily find and access a file or material compared to the case where the operating system inside the terminal performs the specific command (as in the conventional art), so that the operation can be faster and efficiency improves as a result.

Figure 3A:
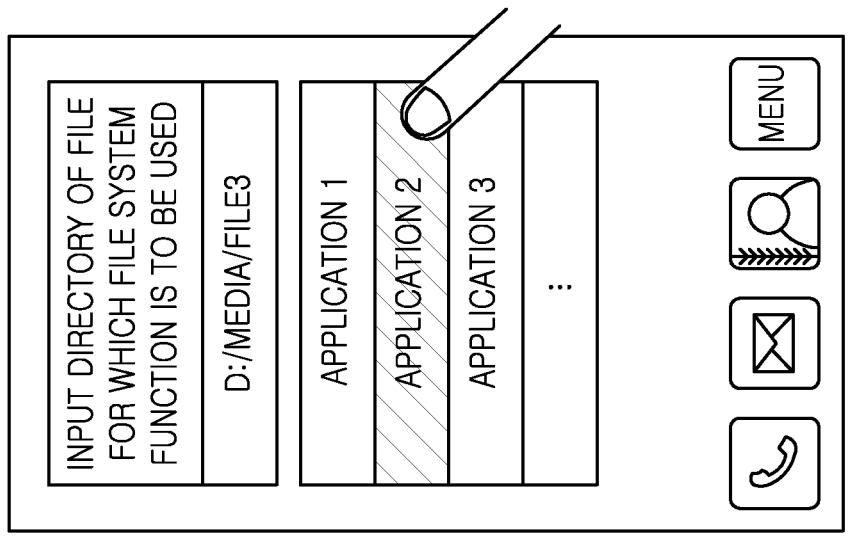
FIGS. 3A and 3B illustrate examples of selecting an application for which a file system function is to be set according to an exemplary embodiment of the present invention.

FIG. 3A is a view illustrating an example of selecting an application for which a file system function is to be set according to an exemplary embodiment of the present invention. As described with reference to FIG. 2B, when a user sets the file system function and selects a directory of a file for which the file system function is to be used, the user typically selects an application to which the file system function is to be set. More specifically, the user should select an application to which the file system function is to be installed among various applications installed in the terminal For example, assuming that the user selects the file system function and selects a file called a "file 3" stored in a directory called Media of a drive "d" of the terminal as a directory for which the file system function is to be used, the user selects an application for storing the file called the "file 3" from the drive d of the terminal. For example, in FIG. 3A, when the user selects the file called the file 3 stored in the directory (which is called the Media of the drive "d") of the terminal as the director of a file for which the file system function is to be used, a message for selecting an application for storing the file 3 is displayed on the display unit of the terminal. At least one application displayed on the display unit of the terminal comprises an application for storing the file called the file 3 to provide the file system function. Therefore, the user may select an application for storing the file of the "file 3" to provide the file system function.

FIG. 3A illustrates selecting an "application 2" from among a plurality of applications, and the selected application 2 may provide the file system function with respect to the file 3. Of course, the user may select two or more applications for providing the file system function depending on the user's setting.

Figure 3B:
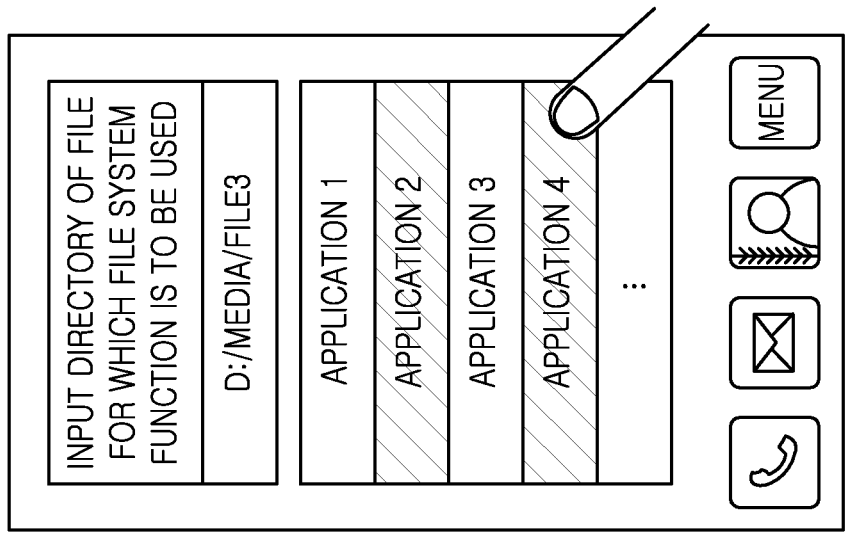

FIG. 3B illustrates an example where two applications have been selected as applications for providing the file system function. Therefore, the user may set a selection of a plurality of applications so that the plurality of applications may provide the file system function to specific contents stored in the terminal.

Figure 4B:
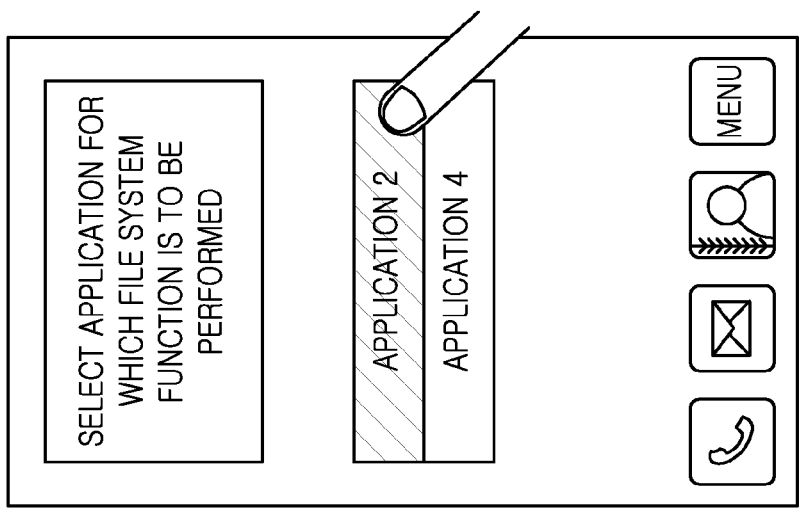
FIGS. 4A and 4B illustrate examples of selecting an application for performing a file system function in the case where a plurality of applications providing a file system function are set according to an exemplary embodiment of the present invention.
Figure 4A:

FIGS. 4A and 4B illustrate examples of selecting an application for performing a file system function in the case where a plurality of applications providing a file system function are set according to an exemplary embodiment of the present invention. As described with reference to FIGS. 3A and 3B, since one or more applications for providing the file system function according to the present invention may be set, FIG. 4B illustrates an exemplary embodiment of selecting one of them. For example, suppose that a user has selected an "application 2" and an "application 4" as applications for which the file system function is to be set with respect to a file called a "file 3". After that, in the case where an application calls the file called the file 3 via the terminal, the terminal retrieves both the application 2 and the application 4 as a result of retrieving applications in which the file 3 is stored. The terminal that has retrieved the two applications providing the file system function displays a message saying that two applications have been retrieved as applications in which the file 3 is stored on the display unit of the terminal as illustrated in FIG. 4A. After that, as illustrated in FIG. 4B, the terminal displays a message for selecting an application for performing the file system function desired. When described using the above example, a message for selecting one of the application 2 and the application 4 providing the file system function with respect to the file 3 is displayed. After that, the user may select one of the application 2 and the application 4 to call the file of the file 3 using the application 2. In other words, the terminal may call for the file 3 from the application 2 to feed back the file 3 to the application that has called for the file 3.

Therefore, the terminal may easily find and access a file or material using an application providing the file system function compared to the case where an operating system inside the terminal performs the specific command.

FIGS. 5A, 5B, and 5C illustrate examples of setting an execution state of a file system function according to an exemplary embodiment of the present invention. Here, the execution state of the file system function denotes setting an execution state of an application providing the file system function. More specifically, the present invention proposes in this exemplary aspect three execution states including: (1) a state of always executing an application providing the file system function, (2) a state of automatically executing an application only when execution of the application is needed, and (3) a state of receiving whether to execute an application whenever execution of the application is needed.

In the first state in case in which an application providing the file system function is set by the user to be always executed, when the terminal is in operation, the application providing the file system function is always in an execution state. FIG. 5A illustrates an example of setting a prompt to always execute an application providing the file system function. More specifically, after setting the file system function, the inputting of a directory of a file for which the file system function is to be used, and selecting an application for which the file system function is to be set, a message for inputting an execution state of the file system function is displayed on the display unit of the terminal.

After that, the user may select the Always portion from among execution states displayed on the display unit of the terminal to allow the file system function to be always executed.

For another usage state, in the case where the terminal is set by the user to receive whether to execute an application whenever execution of the application providing the file system function is needed, the relevant application does not operate in usual time and the terminal receives a message asking each time whether to execute the application whenever execution of the application is needed. FIG. 5B illustrates an exemplary embodiment of setting to receive whether to execute an application whenever execution of the application providing the file system function is necessary. More specifically, after setting the file system function, inputting a directory of a file for which the file system function is to be used, and detecting user-selection of an application for which the file system function is to be set, a message for receiving an execution state of the file system function is displayed on the display unit of the terminal After that, the user may select a Pop-up portion from among execution states displayed on the display unit of the terminal to set to always execute the file system function.

For still another usage state, in the case where an application providing the file system function is set by the user to be automatically executed whenever execution of the application is necessary, the relevant application is not executed in usual time and is automatically executed only when needed. FIG. 5C illustrates an example of setting to automatically execute an application only when execution of the application providing the file system function is needed, thereby saving system resources.

More specifically, after setting the file system function, inputting a directory of a file for which the file system function is to be used, and selecting an application for which the file system function is to be set, a message for receiving an execution state of the file system function is displayed on the display unit of the terminal. After that, a user may set to select Automatic portion among execution states displayed on the display unit of the terminal and execute the file system function only when needed.

In contrast to the present invention, the conventional art, the terminal may transfer a specific command transferred from an application to an application providing the file system function only when the application providing the file system function is being executed. In other words, in the conventional art the terminal may receive and execute the relevant command only when the application providing the file system function is being executed. However, according to the present invention, the terminal may transfer the specific command transferred from an application to the application providing the file system function regardless of whether the application providing the file system function is executed. According to the present invention, the terminal receives an execution state of the application providing the file system function from a user, transfers a specific command transferred from an application to the application providing the file system function even when the application is not being executed, and receives an execution result of the relevant command from the application providing the file system function.

Figure 6B:
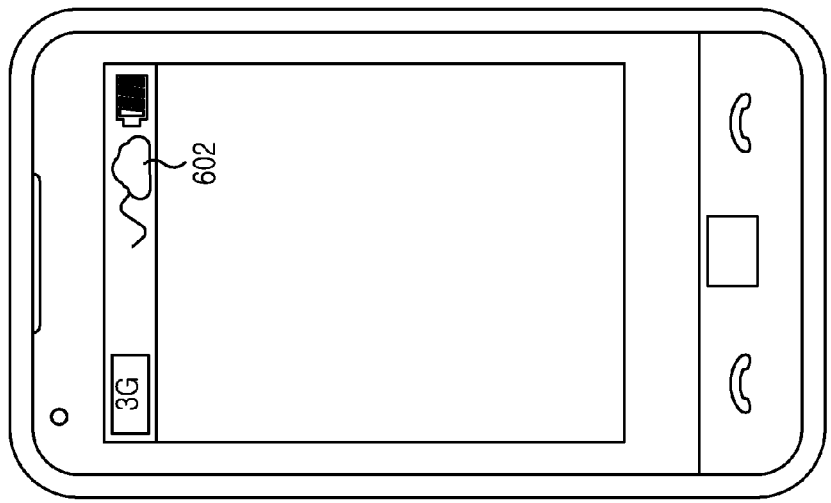
FIGS. 6A and 6B illustrate examples of an indicator operation displaying whether a file system function is provided according to an exemplary embodiment of the present invention.
Figure 6A:
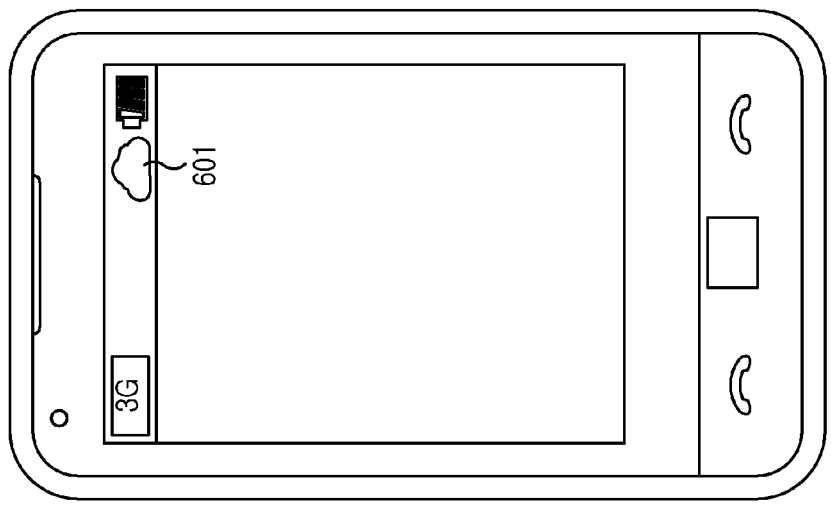

FIGS. 6A and 6B illustrate examples of an indicator operation displaying whether a file system function is provided according to an exemplary embodiment of the present invention. First, a user may determine that the present terminal is a terminal providing the file system function via an indicator 601 illustrated in FIG. 6A.

More specifically, in case of the terminal providing the file system function, the terminal may represent that the present terminal is the terminal providing the file system function by displaying the indicator on its one side. Also, the terminal may represent that the terminal currently provides the file system function via an indicator 602 illustrated in FIG. 6B. Therefore, a user may determine the indicator provided to one side of the terminal to determine whether the present terminal provides the file system function and whether the present terminal currently provides the file system function. An artisan appreciates there are other ways to indicate at a glance whether the system file function is being provided that are within the spirit of the invention and the scope of the appended claims.

Table 1 represents an example of installation information of an application providing the file system function according to an exemplary embodiment of the present invention.

TABLE 1

```
<?xml version="1.0"?>
-<Manifest>
    <Id>Ow1kv60dix/<Id>
    <Secret>4B659A055E80B77EE8834CB0FBD1B8625</Secret>
    <AppVersion>1.0.1</AppVersion>
-<Privileges>
-<Privileges>
    <Name>ALLSHARE</Name>
  </Privileges>
  -<Privileges>
    <Name>STORAGE_SERVICE</Name>
  </Privileges>
  <Privileges>
  -<DeviceProfile>
    <APIVersion>2.0<</APIVersion>
    <CPU>ARM9</CPU>
    <InputDevice>Touch</Input Device>
    <MinimumHeapSize>16</MinimumHeapSize>
    <MinimumVRAMSize>4</MinimumVRAMSize>
    <ScreenSize>480x800</ScreenSize>
    <SoundMixing>Enable</SoundMixing >
  </DeviceProfile>
  </Manifest>
```

Here, <Id>Ow1kv60dix/<Id> on 3rd line represents an ID of an application providing the file system function.

<Secret>4B659A055E80B77EE8834CB0FBD1B8625</Secret> on 4th line represents encryption related information. Also, <Name>ALLSHARE</Name> on 8th line represents the function of an application providing the file system function.

Figure 7:
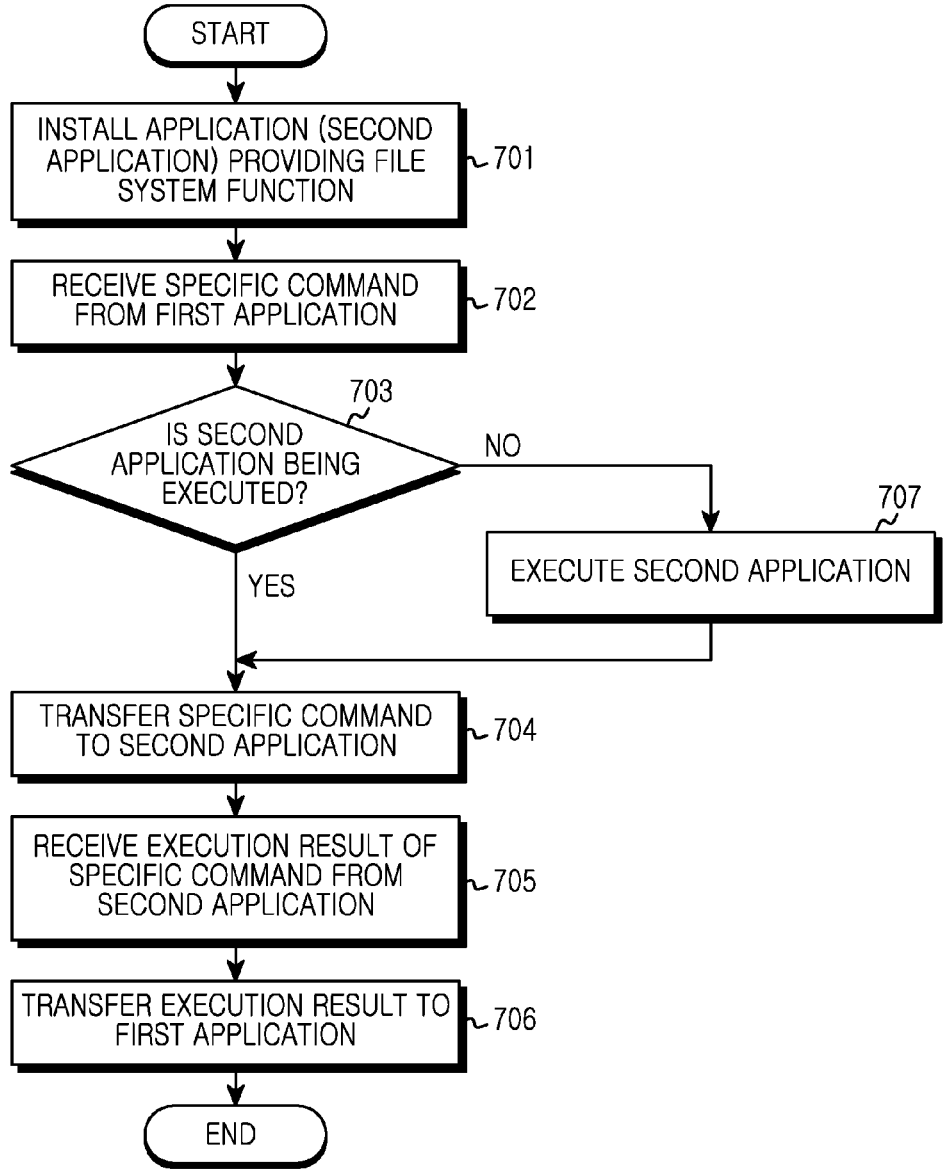
FIG. 7 is a flowchart illustrating a sequence for operating a terminal providing a file system function according to an exemplary embodiment of the present invention.

FIG. 7 is a flowchart illustrating an exemplary sequence for operating a terminal providing a file system function according to an exemplary embodiment of the present invention. As illustrated in FIG. 7, first, an application providing the file system function in a terminal (701) is optionally installed at this point in time in the terminal However, the application may already have been stored in the terminal, and the application could be pre-loaded software or a download upon a user activating new terminal. Here, the file system denotes a system for storing or organizing a file so that a computer may easily find and access a file or material. More specifically, the file system generally denotes managing a physical location of a file using an actual material store device such as a hard disk, or a CD-ROM, Flash, optical, magneto-optical, etc., but may include a method for providing an access to a material on a file server via a client performing a network protocol and a method where only an access means in a virtual form exists. Generally, the file system preferably includes a plurality of layers such as a storage device, an input/output control, a basic file system, a file organize module, and a virtual file system. Therefore, the file system may support various storage devices such as a hard disk, a CD-ROM drive, a flash memory, etc., and a plurality of file systems may be used for one system.

It is also to be appreciated by the person of ordinary skill in the art that steps 702-707 can be performed automatically without user intervention by controller 139. At (702) at which point the second application providing the file system function has been installed previously, pre-loaded by the manufacturer, or just installed, and then a specific command is received from the second application. More specifically, when the first application requests the terminal to transfer the specific command, the terminal does not transfer the specific command to the inside of the operating system of the terminal but transfers (i.e. redirects) the command to the FUSE via the GLIBC and the VFS in order to transfer the command to the second application located outside the operating system. After that, the FUSE that has received the specific command from the first application transfers the relevant command to the On Demand File System Manager Module.

At (703), the On Demand File System Module that has received the specific command from the first application determines whether or not the second application is being executed. More specifically, the terminal can transfer the specific command received from the first application to the second application only when the second application providing the file system function is being executed.

In contrast to (703), in the conventional art, when the application providing the file system function is not being executed, the specific command cannot be transferred to the application providing the file system function. In other words, in case of intending to use an application program providing the file system function, the relevant application program should be executing. The reason for the executing is because when the relevant application program is not being executed, a request for the file system cannot be processed. Therefore, to use the file system, an application program providing the relevant file system function should be executed at least concurrently or in advance. Therefore, since a point of time at which the relevant file system is to be used cannot be known in advance, the user is greatly inconvenienced in the conventional art. However, the present invention has an advantage of transferring a specific command received from the first application to the second application regardless of whether the application providing the file system function is being executed when (or even while) the specific command is received.

When the On Demand File System Manager Module determines whether or not the second application is being executed and determines the second application is being executed, at (704) the On Demand File System Manager Module transfers the specific command to the second application. More specifically, when the On Demand File System Manager Module determines the second application is being executed, the On Demand File System Manager Module transfers the specific command received from the first application to the second application via the On Demand File System Interface Module.

After that, the second application performs the specific command received from the On Demand File System Interface Module. For example, in the case where the above specific command comprises a command for storing a specific file, the second application stores the specific file received from the first application in the second application.

With continued reference to FIG. 7, at (705), the On Demand File System Manager Module that has transferred the specific command to the second application receives an execution result of the specific command from the second application. More specifically, the On Demand File System Manager Module receives the execution result of the specific command executed by the second application via the On Demand File System Interface Module. For example, in the case where the specific command received from the first application is a command for reading a specific file, the second application transfers the specific file stored in the second application to the On Demand File System Manager Module via the On Demand File System Interface Module. A person of ordinary skill in the art understands and appreciates that the present invention can be performed with many variations. For example, if the command is a read command, it is also possible that a copy of the file could be provided to the On Demand File System Manager rather than a transfer of the file. Also, if a transfer occurs, the second application may include a pointer that indicates where the file was transferred to so that it can be subsequently accessed. The pointer could be in addition to any allocation table that may be kept by the file system.

At (706), the On Demand File System Manager Module that has received the execution result of the specific command from the second application transfers the execution result to the first application. More specifically, the On Demand File System Manager Module that has received the execution result of the specific command from the second application transfers the execution result of the specific command to the first application via the FUSE, the VFS, and the GLIBC.

At step (703), when determining that the second application is not being executed in the above process, at (707) the terminal may then execute the second application. More specifically, the On Demand File System Module that has received the specific command from the first application determines whether the second application is currently being executed, and when determining the second application is not being executed, the On Demand File System Manager Module transfers a command for executing the second application to an Application Manager Module. After that, the On Demand File System Manager Module executes the second application.

According to an exemplary aspect of the present invention, with reference to FIG. 1B, the On Demand File System Manager Module can receive a specific command from the first application to transfer the received specific command to the second application regardless of whether the second application is executed, and receive an execution result of the specific command from the second application. Also, the On Demand File System Manager Module stores information of the second application read from the Package Manager Module and a received execution state of the second application. Also, in the case where execution of the second application is stopped, the On Demand File System Manager Module determines a set execution state of the second application and transfers the transferred specific command to the executed second application. Additionally, in the case where execution of the second application is stopped, the On Demand File System Manager Module determines a set execution state of the second application and executes the second application to transfer the received command to the executed second application. Also, the On Demand File System Manager Module feeds back an execution result of the specific command to the first application.

The On Demand File System Interface Module provides an interface common to the second application and the On Demand File System Manager Module so that the second application may operate.

When the controller determines that an execution state is a state for automatically executing the second application only when execution of the second application is needed, the Application Manager Module automatically executes the second application.

The Package Manger Module installs the second application to read information of the installed second application, and receives an execution state of the installed second application. Also, the Package Manger Module may receive a command for always executing the second application, a command for automatically executing the second application when execution of the second application is needed, or a command for receiving whether to execute the second application whenever execution of the second application is needed.

When the controller determines that the execution state of the second application is a state for receiving whether to execute the second application whenever the execution of the second application is needed, the Graphic Library Module can display a message on output unit 146 as to whether to execute the second application and receives a command for executing the second application.

The communication module 144 processes a signal transmitted/received via an antenna for voice and data communication.

The input unit 148 provides input data generated by a user's selection to the controller 139.

The output unit 146 displays state information of the mobile terminal, a menu screen, and story information under control of the controller 139.

The storage 142 may include a separate program storage for storing a program for controlling an operation of the terminal and a data storage for storing data occurring during execution of a program.

The controller 139 may perform an overall function of the mobile terminal Separate configuration and illustration of the controller 139 in an exemplary embodiment of the present invention is for separately describing each function. Therefore, in actual realization of a product, all or some of the functions of the mobile terminal may be processed by the controller 139.

The above-described methods according to the present invention can be implemented in hardware, firmware or as software or computer code that can be stored in a recording medium such as a CD ROM, an RAM, a floppy disk, a hard disk, thumbnail drive or a magneto-optical disk or computer code downloaded over a network originally stored on a remote recording medium or a non-transitory machine readable medium and to be stored on a local non-transitory recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a terminal, the method comprising:
receiving by a controller a specific command executable by a second application providing a non-Operating System file system from a first application;
attempting transfer by a kernel of an Operating System being executed by the controller of the terminal the received specific command to the second application providing the non-Operating System file system for data processing;

detecting whether the second application is being executed, and
if the second application is being executed, transferring the received specific command to the second application, and
if the second application is not being executed, executing the second application and transferring the received specific command to the second application;
receiving an execution result of the specific command from the second application;
providing the execution result to the first application to execute a function of the terminal: and,
displaying a file system function indicator in a state indicator region of a screen of the terminal when the second application is available to provide the non-Operating System file system,
wherein the first application operates outside of the Operating System of the terminal.

2. The method of claim 1, wherein the second application comprises an application providing a file system function, and the kernel provides an interface between a Virtual File System (VFS) and the controller of the terminal.

3. The method of claim 1, wherein the specific command comprises at least one of a command for reading a specific file from a storage and a command for storing the specific file.

4. The method of claim 2, wherein the received specific command is executable by plurality of applications providing a plurality of non-Operating System file systems, further comprising:
displaying on a screen of the terminal a dialogue including the plurality of applications providing the plurality of non-Operating System file systems; and
setting at least one of the plurality of applications in response to receiving a user selection of the one of the plurality of applications as detected by an input unit of the terminal.

5. The method of claim 1, further comprising:
reading information of the second application by the controller;
display on a screen of the terminal a dialogue to set an execution state of the second application and receive an input setting the execution state; and
storing the read information of the second application and the received input setting the execution state of the second application.

6. The method of claim 5, wherein the information of the second application read by the controller comprises at least one of an Identification (ID) of the second application, encryption related information of the second application, and a function of the second application.

7. The method of claim 5, wherein the input setting the execution state of the second application comprises at least one of:
executing the second application at all times,
executing the second application after receiving a positive response to a dialogue generated when execution of the second application is required, and
automatically executing the second application when detecting execution of the second application is required.

8. The method of claim 7, wherein the received execution state is displayed by a display screen of the terminal.

9. The method of claim 8, where the terminal outputs the execution state as a changeable prompt.

10. The method of claim 1, wherein the transferring of the received specific command to the second application regardless of whether the second application is being executed comprises:
when execution of the second application is stopped, determining a set execution state of the second application;
when the execution state is a state for automatically executing the second application only when the execution of the second application is needed, automatically executing the second application; and
transferring the received specific command to the executed second application for processing.

11. The method of claim 1, wherein the transferring of the received specific command to the second application regardless of whether the second application is executed comprises:
when execution of the second application is stopped, determining a set execution state of the second application;
when the execution state comprises a state for receiving whether to execute the second application whenever execution of the second application is required, displaying a message prompting as to whether to execute the second application;
receiving a command for executing the second application; and
transferring the received command to the executed second application.

12. The method of claim 1, further comprising:
modifying the file system function indicator visually when the second application is executing to provide the non-Operating System file system.

13. The method of claim 4, wherein at least two of the plurality of applications were set by the user selection, further comprising:
in response to receiving the specific command executable by the plurality of applications, displaying on the screen of the terminal a dialogue including the at least two of the plurality of applications; and
receiving a selection of one of the at least two of the plurality of applications to provide an execution result of the received specific command executable by the plurality of applications.

14. An apparatus of a terminal, comprising:
a non-transitory storage;
one or more processors being configured with machine executable code to provide:
an On Demand File System Manager Module for:
receiving a specific command executable by a second application providing a non-Operating System file system from a first application,
attempting transfer of the received specific command executable by a non-Operating System file system to the second application providing the non-Operating System file system, and detecting whether the second application is being executed,
if the second application is being executed transferring the received specific command to the second application and if the second application is not being executed, executing the second application and transferring the received specific command to the second application, and
receiving an execution result of the specific command from the second application;
an On Demand File System Interface Module for providing an interface common to the second application and the On Demand File System Manager Module so that the second application is operable; and a file system function indicator displayed in a state indicator region of a screen of the terminal when the second application is available to provide the non-Operating System file system, wherein the first application operates outside of an Operating System of the terminal, and a kernel of the Operating System provides an interface between a Virtual File System (VFS) and the one or more processors of the terminal.

15. The apparatus of claim 14, wherein the second application comprises an application providing a file system function.

16. The apparatus of claim 14, wherein the specific command comprises at least one of a command for reading a specific file and a command for storing the specific file in the storage.

17. The apparatus of claim 14, further comprising the one or more processors being configured to provide a Package Manager Module for optionally installing the second application, reading information of the second application, and receiving an execution state of the second application, wherein the On Demand File System Manager Module stores the information of the second application read from the Package Manager Module and the received execution state of the second application.

18. The apparatus of claim 17, wherein the information of the second application comprises at least one of an Identification (ID) of the second application, encryption related information of the second application, and a function of the second application.

19. The apparatus of claim 17, wherein the one or more processors are further configured to:

display on a screen of the terminal a dialogue to set an execution state of the second application and receive an input setting the execution state, the execution state comprising at least one of:

executing the second application at all times, executing the second application after receiving a positive response to a dialogue generated when execution of the second application is required, and automatically executing the second application when detecting execution of the second application is required.

20. The apparatus of claim 14, wherein when execution of the second application is stopped, the On Demand File System Manager Module determines a set execution state of the second application, and wherein the one or more processors are further configured to comprise an Application Manager Module for automatically executing the second application, when the execution state is a state for automatically executing the second application only when the execution of the second application is necessary, and wherein the On Demand File System Manager Module transfers the transferred specific command to the executed second application.

21. The apparatus of claim 14, wherein when execution of the second application is stopped, the On Demand File System Manager Module determines a set execution state of the second application, and wherein the one or more processors are further configured to comprise a Graphic Library Module for displaying a message as to whether to execute the second application, when the execution state is a state for receiving whether to execute the second application whenever execution of the second application is necessary, and wherein the On Demand File System Manager Module executes the second application and transfers the received command to the executed second application.

22. The apparatus of claim 14, wherein the On Demand File System Manager Module feeds back an execution result of the specific command to the first application.

* * * * *